US008233741B1

(12) United States Patent
Wilson et al.

(10) Patent No.: US 8,233,741 B1
(45) Date of Patent: Jul. 31, 2012

(54) REDUCING BUILDING LEAN IN STITCHED IMAGES

(75) Inventors: Randall Wilson, Albuquerque, NM (US); Charles C. Rhodes, Los Altos, CA (US); Yong K. Hwang, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 331 days.

(21) Appl. No.: 12/591,366

(22) Filed: Nov. 17, 2009

(51) Int. Cl.
*G06K 9/20* (2006.01)
(52) U.S. Cl. .................... 382/284; 382/100; 382/276
(58) Field of Classification Search .................. 382/100, 382/154, 276, 284
See application file for complete search history.

(56) References Cited

U.S. PATENT DOCUMENTS

| | | | | |
|---|---|---|---|---|
| 6,476,802 B1 * | 11/2002 | Rose et al. | ............... | 345/419 |
| 6,798,407 B1 * | 9/2004 | Benman | ............... | 345/419 |
| 7,755,635 B2 * | 7/2010 | Benman | ............... | 345/582 |
| 2003/0086604 A1 * | 5/2003 | Oniyama | ............... | 382/154 |
| 2011/0244919 A1 * | 10/2011 | Aller et al. | ............... | 455/556.1 |

* cited by examiner

*Primary Examiner* — Stephen R Koziol
(74) *Attorney, Agent, or Firm* — Sterne, Kessler, Goldstein & Fox P.L.L.C.

(57) ABSTRACT

A method for reducing building lean in stitched images includes accessing overlapping images of a geographic area, and calculating a pixel preference cost for each pixel region of a plurality of pixel regions in each image based on a location of the respective pixel region in a three-dimensional projection of each image. The method also includes selecting a pixel region from the images for each of a plurality of pixel region positions in the geographic area by reducing a cost function that includes the pixel preference cost, and assigning the respective selected pixel region to each of the pixel region positions to create the stitched image containing the building with reduced lean. In another embodiment, the pixel preference cost includes a distance from center cost that is based on a distance to the respective pixel region from the center of the image. Corresponding systems and computer readable media are also disclosed.

20 Claims, 10 Drawing Sheets

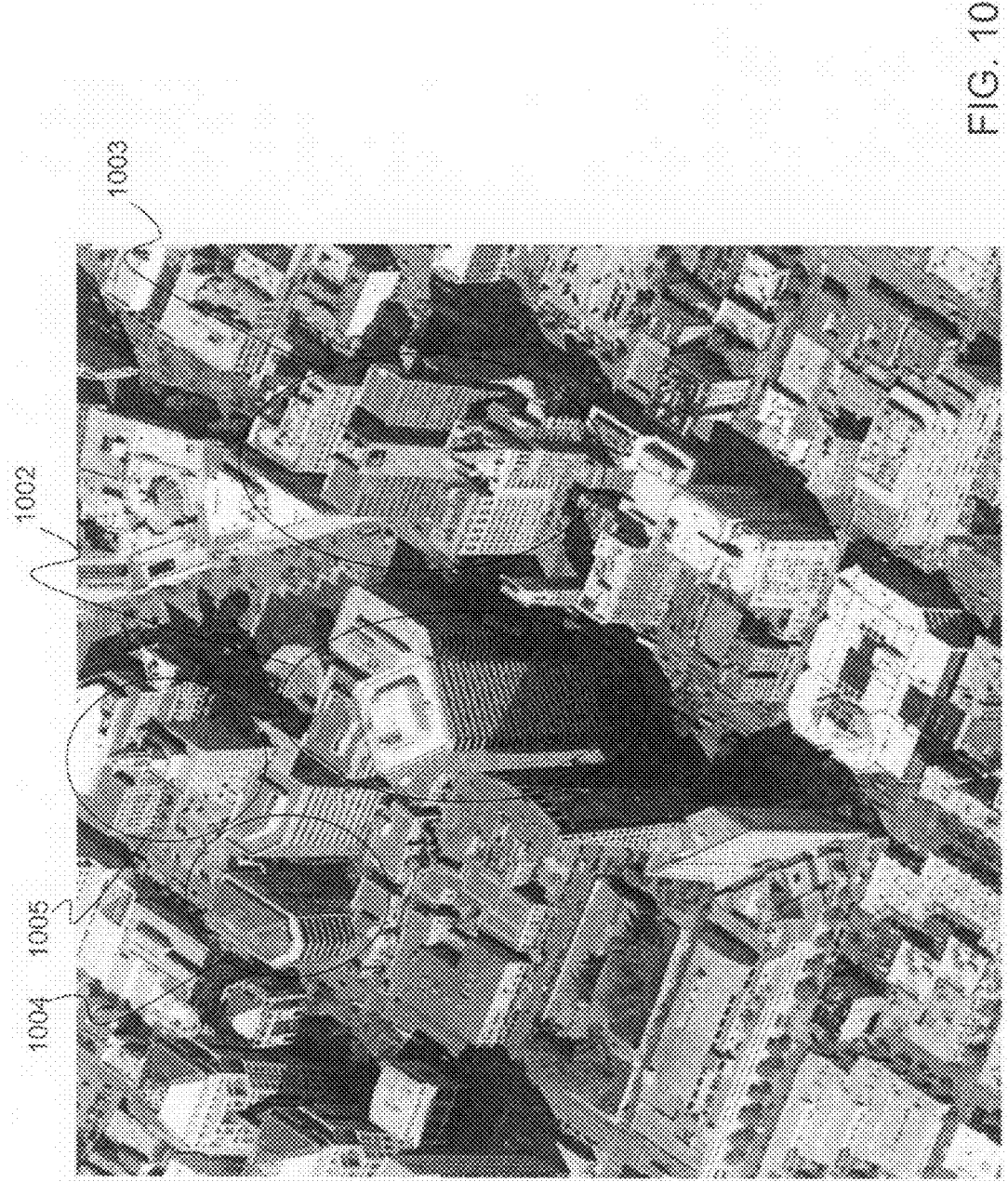

REDUCING BUILDING LEAN IN STITCHED IMAGES

BACKGROUND

1. Technical Field

Embodiments of the present invention relate to processing of digital images, and more particularly to reducing building lean in stitched images.

2. Background Art

Image mosaics are created by merging multiple digital images. For example, a view of urban Chicago presented to a user by the Google Earth application (available from Google Inc. of Mountain View, Calif.) may be composed of many overlapping individual images, each of a different area of urban Chicago. The overlapping individual images of the different areas are merged together to form a comprehensive view of the entire area. The process of merging two or more individual images is referred to as "stitching." An image mosaic is referred to as a "stitched image."

Depending on the view to be illustrated in the stitched image, the type of individual image that is used may be different. One type of image is the "oblique image." Oblique images are photographic images captured from an aerial platform, such as a low altitude aircraft, at an angle. For example, an aircraft flying over urban Chicago may capture a series of photographs of the area below at an angle. This series of photographs can form a set of oblique images that are later stitched together to form a stitched image of urban Chicago. Due to the angle at which they are captured, oblique images have desirable characteristics such as making the sides of buildings visible while encompassing a large geographic area. In essence, oblique images present three dimensional views of buildings and other structures on the ground that are not visible in straight-down orthographic images. Thus oblique images are particularly useful, for example, in applications where views of the sides of buildings and structures are sought.

However, some types of photographic images of geographic areas, such as oblique images, have characteristics that result in stitched images containing distortions. One such characteristic is that, due to perspective in oblique images, buildings and structures in the left part of the image often appear to lean left while buildings in the right part of the image appear to lean right. In an individual oblique image, this appearance of leaning may not be particularly noticeable. However, when two or more images with building lean are stitched together, the distortions due to building lean can be particularly distracting: For example, in adjacent images in the stitched image, one building can be leaning left while another leans right.

Therefore, methods and systems to reduce the appearance of building lean in stitched images are desired.

SUMMARY

Photographic images, such as aerial oblique images, are often used in stitched images. However, often buildings and other tall structures contained in oblique images appear to lean to the left or right depending on the location of the building or structure in the image. Embodiments of the present invention include methods and systems for reducing building lean in stitched images.

One embodiment includes a method for reducing the lean of at least one building in a stitched image. The method includes accessing a plurality of digital images of a geographic area, where each image at least partially overlaps one or more other images, and where each image contains at least a partial view of the building that has the lean to be corrected. The method further includes calculating a pixel preference cost for each pixel region of a plurality of pixel regions in each image, where the pixel preference cost is based on a location of the respective pixel region in a three-dimensional projection of said each image. The method also includes selecting a pixel region from the plurality of digital images for each of a plurality of pixel region positions in the geographic area by reducing a cost function that includes the pixel preference cost, and assigning the respective selected pixel region to each of the pixel region positions to create the stitched image containing the building with reduced lean. In some embodiments, the pixel preference cost can include one or more of a view alignment cost based on an angle between an intended view direction of a camera capturing the respective image and the respective pixel region, and a distance from center cost, wherein the distance from center cost is based on a distance to the respective pixel region from the center of the image. In another embodiment, pixel preference cost includes a distance from center cost and does not include a view alignment cost.

Another embodiment is a system for reducing the lean of at least one building in a stitched image. The system includes a collection of digital images stored in a memory medium and at least one processor coupled to the memory medium. The processor is configured to perform several functions. One function performed by the processor is to access a plurality of digital images of a geographic area where each image at least partially overlaps another image and where each image contains at least a partial view of the building with the lean to be corrected. Another function performed by the processor is to calculate a pixel preference cost for each pixel region of a plurality of pixel regions in each image where the pixel preference cost is based on a location of the respective pixel region in a three-dimensional projection the image. The processor also performs the functions to select a pixel region from the plurality of digital images for each of a plurality of pixel region positions in the geographic area where the pixel region is selected by reducing a cost function that includes the pixel preference cost, and to assign the respective selected pixel region to each of the pixel region positions to create the stitched image containing the building with reduced lean.

Yet another embodiment is a computer readable medium storing instructions wherein said instructions, when executed, cause a processor to reduce the lean of at least one building in a stitched image using a method. The instructions cause the processor to access a plurality of digital images of a geographic area where each image at least partially overlaps one or more other images, and where each image contains at least a partial view of the building that has the lean to be corrected. The instructions further cause the processor to calculate a pixel preference cost for each pixel region of a plurality of pixel regions in each image, where the pixel preference cost is based on a location of the respective pixel region in a three-dimensional projection of said each image. The instructions also cause the processor to select a pixel region from the plurality of digital images for each of a plurality of pixel region positions in the geographic area by reducing a cost function that includes the pixel preference cost, and assigning the respective selected pixel region to each of the pixel region positions to create the stitched image containing the building with reduced lean.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

Reference will be made to the embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 10 shows the stitched image of the urban area of FIG. 3 after being processed according to an embodiment of the present invention.

DETAILED DESCRIPTION

While the present invention is described herein with reference to illustrative embodiments for particular applications, it should be understood that the invention is not limited thereto. Those skilled in the art with access to the teachings herein will recognize additional modifications, applications, and embodiments within the scope thereof and additional fields in which the invention would be of significant utility.

Overview

Embodiments of the present invention include methods and systems for reducing the appearance of building lean in stitched images, such as stitched images created by stitching together oblique photographic images. For conciseness and convenience, this document refers to reducing the appearance of building lean. However, it should be understood that the term building, as used herein, includes other natural and man-made structures, such as communication towers, trees, and the like, that display similar leaning characteristics in images such as oblique images.

Figure 1:
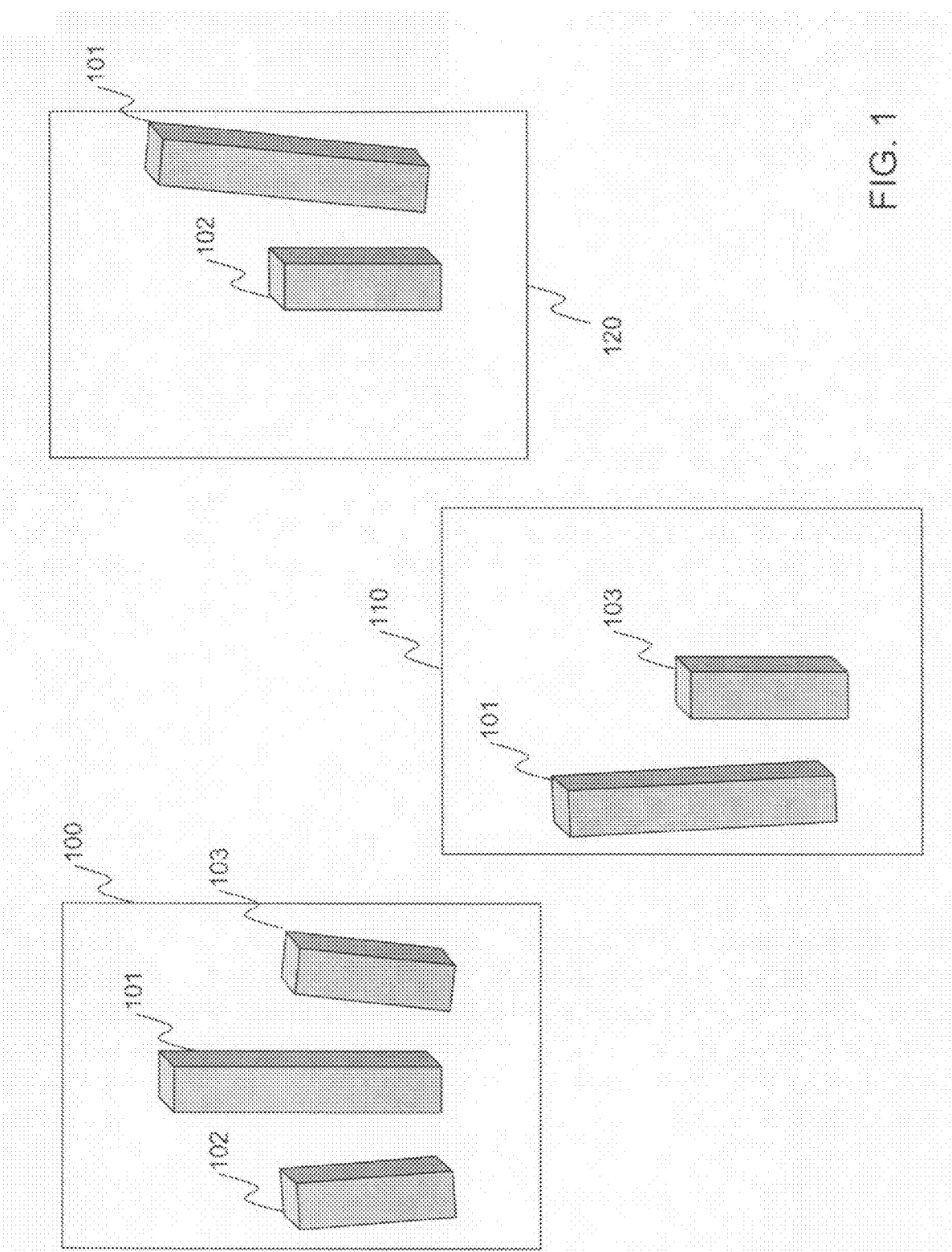
FIG. 1 illustrates sketches of example overlapping images containing different views of a group of buildings.

FIG. 1 illustrates three example images 100, 110, and 120, each containing a building 101. Images 100, 110, and 120 may, for example, be illustrative of aerially captured oblique images of a geographic area. In image 100, building 101 appears straight, as desired, because building 101 is located close to the center of the image. Buildings 102 and 103, located to the left and right of building 101, appear to lean to the left and to the right, respectively. In image 110 where the same scene is located on the left of the image, building 101 appears leaning to the left while building 103 appears straight in the center of the image. In image 120 where the same scene is located to the right of the image, building 101 appears leaning to the right while building 102 appears straight in the center of the image. The effect of nearby buildings leaning in opposite directions, such as that illustrated in image 100, would be significantly more distracting when numerous images like image 100 are stitched together to form a stitched image of an entire area. In a large stitched image such building lean can create very noticeable distortions, e.g., buildings leaning toward and away from one another, and can detract from the quality of the stitched image.

Figure 2:
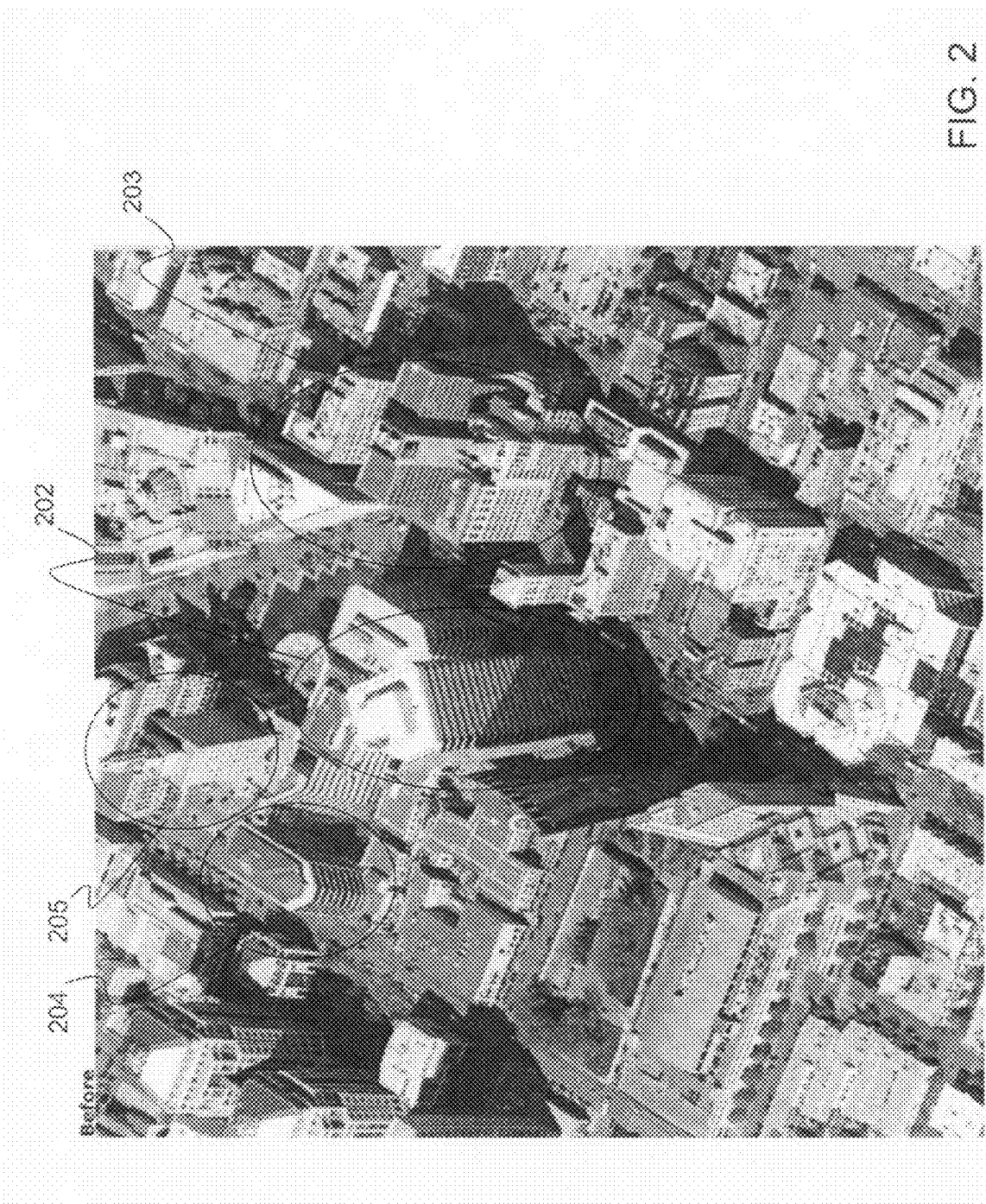
FIG. 2 shows a stitched image of an urban area, where the stitched image is based on aerial oblique images.

A stitched image of an urban area is shown in FIG. 2. The stitched image of FIG. 2 does not have building lean reduced, and several examples of adjacent buildings leaning in opposite directions are evident. For example, buildings 202 and 203 appear to lean left and right, respectively. Also, adjacent buildings 204 and 205 appear to lean right and left, respectively. Buildings 204 and 205, for example, may be from two separate oblique images that have been merged with the merge seam located between buildings 204 and 205. Embodiments of the present invention include methods and systems to automatically reduce the leaning appearance of buildings in stitched images created by stitching images such as those depicted in FIG. 1.

System to Reduce Building Lean in Stitched Images

Figure 3:
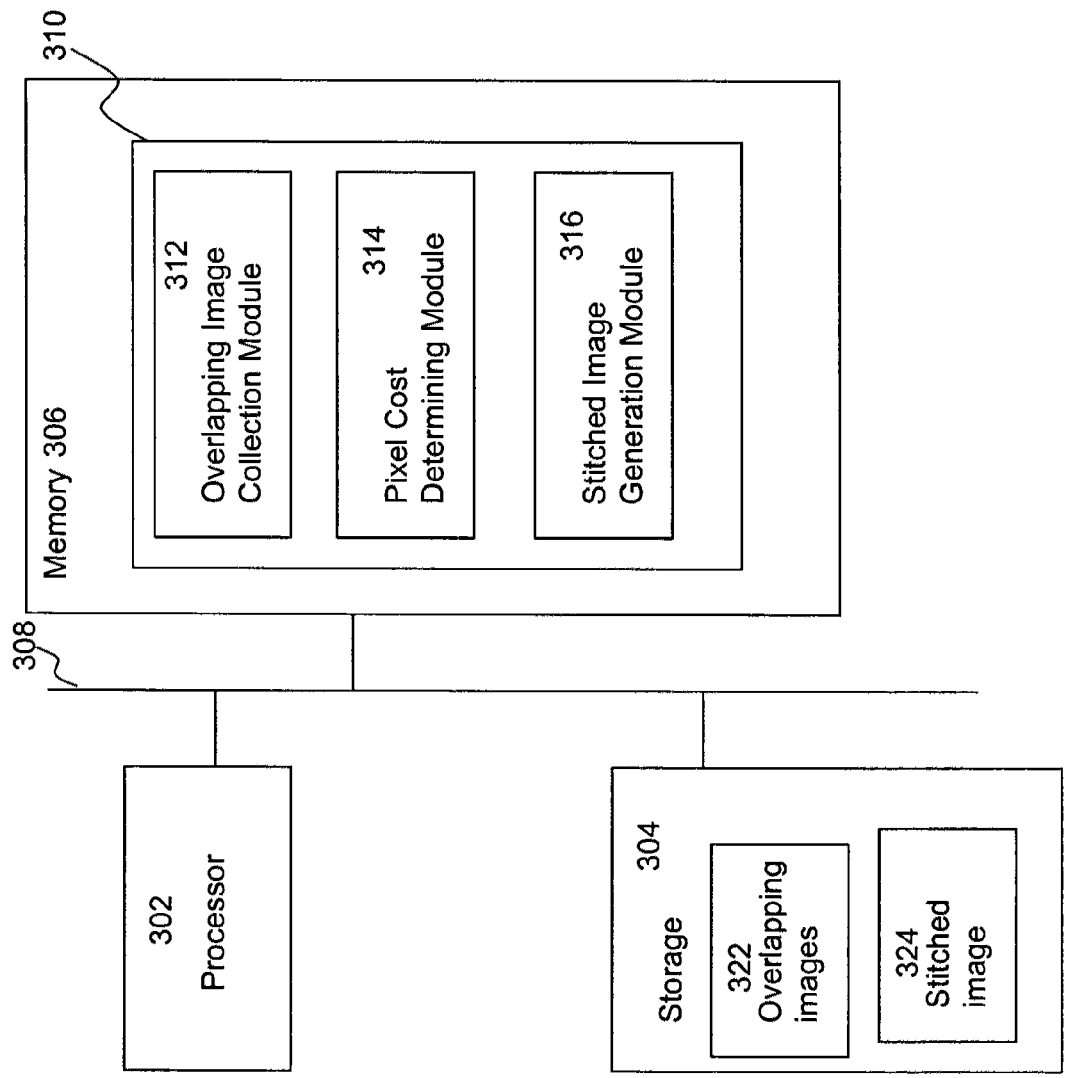
FIG. 3 is a system according to an embodiment of the present invention.

FIG. 3 illustrates a computer system 300, according to an embodiment of the present invention. Computer system 300 includes a processor 302, a storage 304, a dynamic memory 306, and a communication infrastructure 308. A person of skill in the art will understand that other components may be included in computer system 300, such as, but not limited to, input/output devices, network interfaces, displays, and the like.

Processor 302 can include one or more commercially available processors, or custom processors such as field programmable gate arrays (FPGA), digital signal processors (DSP), and application specific integrated circuits (ASIC). Processor 302 controls the operation of components and/or modules of system 300 and may execute processing logic, such as that of building lean reducer 310. Storage 304 can include one or more removable or non-removable non-volatile digital storage devices such as a hard disk drive, flash memory device, digital video disk, and the like. Removable or non-removable non-volatile digital storage devices are also known as computer readable media. Memory 306 can include one or more of a volatile memory such as dynamic random access memory (DRAM), a static random access memory (SRAM), and the like. Communication infrastructure 308 communicatively couples processor 302 to other components and modules of system 300. Communication infrastructure 308 can include one or more of a bus (e.g. Peripheral Connection Interface bus), switch (e.g. crossbar switch), network (e.g. Ethernet), or like device.

Computer system 300, during operation, may contain the processing logic of building lean reducer 310 in memory 306. Building lean reducer 310 includes the processing logic for generating stitched images with reduced building lean, according to an embodiment of the present invention. According to an embodiment, building lean reducer 310 includes an overlapping image collection module 312, a pixel cost determining module 314, and a stitched image generator module 316. Overlapping image collection module 312 locates a plurality of overlapping images that are to be merged to create the stitched image of a geographic area. Pixel cost determining module 314 determines a pixel cost preference related to the pixels or regions of pixels of each image. As used herein, a "region of pixels" or "pixel region" can refer to a single pixel or two or more adjacent pixels. Stitched image generation module 316 creates the stitched image by merging the images located by overlapping image collection module 312 using the pixel preference costs computed by pixel cost determining module 314. The functionality of each of the modules 312-316, and building lean reducer 310, is described in relation to flowcharts of FIGS. 4, 5 and 7. In the embodiment described herein, modules 312-316 are implemented in software. However, a person of skill in the art would understand that modules 312-316 can be implemented in hardware, firmware, or software, or using a combination thereof.

Storage 304 can include images including the overlapping oblique images 322 that are to be merged to generate the stitched image, according to an embodiment of the present invention. Storage 304 can also include the stitched image 324 generated according to an embodiment of the present invention, for example, by the execution of processing logic 310 over the collection of overlapping images 322.

Process for Reducing Building Lean in Stitched Images

Figure 4:
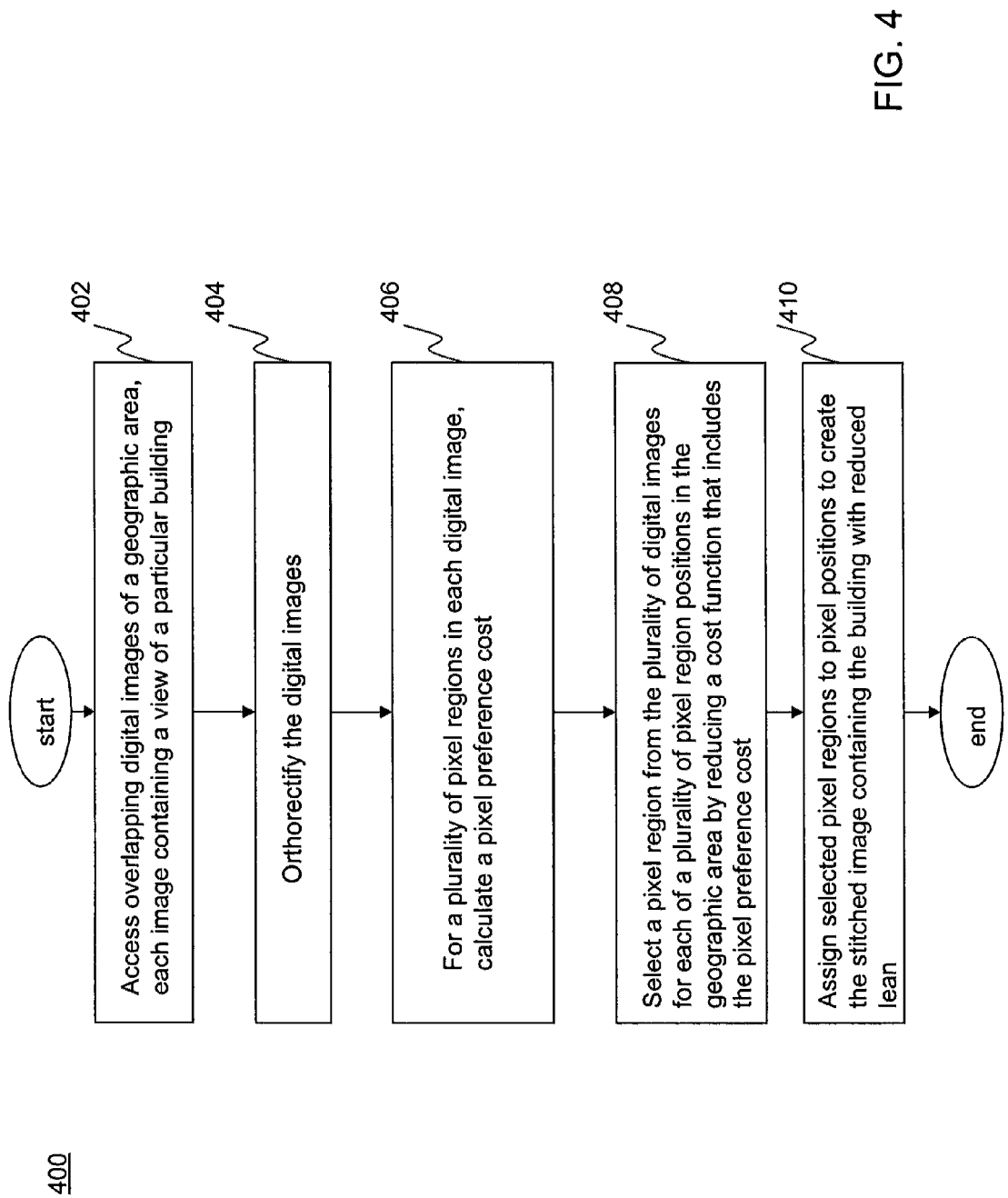
FIG. 4 is a method for reducing building lean in stitched images, according to an embodiment of the present invention.

FIG. 4 illustrates process 400 (steps 402-410) that creates a stitched image with reduced building lean according to an embodiment of the present invention. In step 402, a plurality of overlapping images of a geographic area is accessed. In an embodiment, the images include aerially acquired oblique images. For example, the oblique images may be acquired using a camera located in a low altitude aircraft, where the camera is configured with an intended view direction of a 45 degree angle below the horizontal plane parallel to the ground and intersecting the focal point of the camera, in a direction perpendicular or parallel to the direction of the aircraft. The intended view direction, for example, can be one of north, east, south or west at a 45 degree angle below the horizontal plane parallel to the ground and intersecting the focal point of the camera. Each image in the plurality of images may overlap with at least one other image in the plurality of images. The extent of overlap among images may be within a predefined range. For example, in urban areas where more detailed imagery is required, images may be acquired having about a 70% overlap, while in rural areas an overlap of about 40% would be adequate. A higher overlap rate between images yields a greater choice in selecting each pixel or region of pixels for the stitched image. The plurality of images from which the stitched image of a geographic area would be created can be collected by overlapping image collection module 312. Images, including the plurality of images from which the stitched image of the geographic area would be created, can be stored in a digital storage medium accessible to computer system 300, such as, for example, storage 304. As described above, oblique images can contain the views of one or more buildings that appear to be leaning. The images can also include information pertaining to the geographic coordinates associated with each image, such as, for example, geographic parameters latitude, longitude, and elevation. The geographic parameters can be embedded in the image, or can be stored in a separate file in a form that can be associated with the respective images. Other information, such as information required for orthorectification, can also be associated and made available with each image.

In step 404, the plurality of images selected in step 402 is orthorectified. In one or more embodiments of the present invention, the orthorectification of the images is optional. Aerial images typically show buildings and structures in slightly shifted locations due to displacements caused by the tilt of the camera and geographic characteristics of the terrain. Orthorectification removes (or reduces) the distorting effects due to factors including camera tilt and terrain characteristics. Orthorectification facilitates accurate determination of, for example, the location of base of buildings in the geographic area, and also facilitates accurate measurements of distance and direction.

Orthorectification in step 404 can be performed according to well known methods. The orthorectification process is typically based on a transformation model which considers the sources of image distortion generated at the time of image acquisition. The sources of distortion considered in orthorectification can include camera orientation, geographic or topographic characteristics, the orbit and altitude of the aerial platform containing the camera, and earth shape and rotation. Information related to the sources of distortion needed for orthorectification can be made available by, for example, embedding the information in the images or by storing in a separate file.

In step 406, a pixel preference cost is computed for each of a plurality of pixel regions in each of a plurality of digital images according to an embodiment of the present invention. The pixel preference costs are computed in images that have been orthorectified according to step 404 described above. In another embodiment, step 406 may be performed on a plurality of digital images that have not been orthorectified.

For each respective image, the pixel preference cost for each pixel region can include one or both of a view alignment cost and a distance from center cost. The view alignment cost is computed based on a three-dimensional projection of the respective image. For each of a plurality of pixel regions in an image, the view alignment cost quantifies the angle of the pixel region from the intended view direction of the camera, and the distance from center cost quantifies the distance to the pixel region from the center of the image. In embodiments in which the pixel regions have a single pixel, the view angle and the distance from center is determined with respect to that single pixel. In embodiments in which the pixel regions have two or more adjacent pixels, the view angle cost and the distance from center cost can be determined based on various methods, including determining the costs with respect to the center pixel of the region of pixels, or as a statistical measure (e.g., average, minimum, maximum, and the like) of the costs determined for two or more respective pixels within the region of pixels. The pixel preference cost, or more particularly, one or both of the view alignment cost and the distance from center cost, defines measures of preference for pixel regions based on the respective pixel region's correspondence to the intended view direction of the camera and/or the proximity to the center of the image. The determination of the pixel preference cost is described in more detail in relation to FIGS. 5 and 6.

The geographic area to be represented in the stitched image can be determined from predefined information or from the plurality of digital images that are to be merged. The geographic area to be displayed in the stitched image can be represented as a plurality of pixel region positions, each pixel region position to be filled by a pixel region selected from the plurality of digital images. In step 408, for each pixel region position in the geographic area to be displayed in the stitched image, a pixel region is selected from the plurality of digital images. The pixel region corresponding to each pixel region position of the geographic area is selected so as to optimize a cost function that includes the pixel preference cost computed in step 406. Selection of pixel regions may be done individually, in groups, or for all pixel region positions of the geographic area. Accordingly, optimization of the cost functions may be for individual pixel regions, groups of pixel regions, or for all pixel region positions of the geographic area. In an embodiment of the present invention, the cost function includes one or more terms quantifying the differences between the current image and the adjacent image to be stitched with, and one or more terms representing the pixel preference cost described above. The terms of the cost function may be weighted according to a predetermined scheme, and/or according to a dynamically reconfigurable scheme. The cost function, according to an embodiment of the present invention, can be minimized globally over the entire geographic area. In another embodiment, the cost function may be minimized over local areas, for example, areas defined based on uniformity of geographic characteristics or other image characteristics such as building density and the like. The cost function and the selection of pixel regions for each position in the defined geographic area is discussed in more detail with respect to FIG. 9.

In step 410, for each pixel region position in the geographic area to be displayed in the stitched image, the pixel region selected in step 408 is assigned to produce the stitched image having reduced building lean. The assignment of pixel regions selected from the plurality of digital images to each pixel region position in the geographic area, in effect, merges (i.e., stitches) images from the plurality of digital images to create the stitched image. Steps 406-410 may be implemented as a modified graph-cut algorithm to determine the optimum placement of seams between images that are merged to encompass a geographic area.

Use of a graph-cut algorithm to merge two or more images is well known in the related arts. However, as conventionally implemented, when used to stitch two or more aerially acquired oblique images of a geographic area, the stitched image may contain undesirable characteristics such as the building lean as described above. Embodiments of the present invention use a modified graph-cut algorithm to select images, and respective pixel regions, based on a cost function that accounts for characteristics including building lean in the images. The modified cost function and the selection of pixel regions to be merged into the stitched image are discussed in more detail with respect to FIGS. 5 and 9.

Determining Pixel Preference Cost

Figure 5:
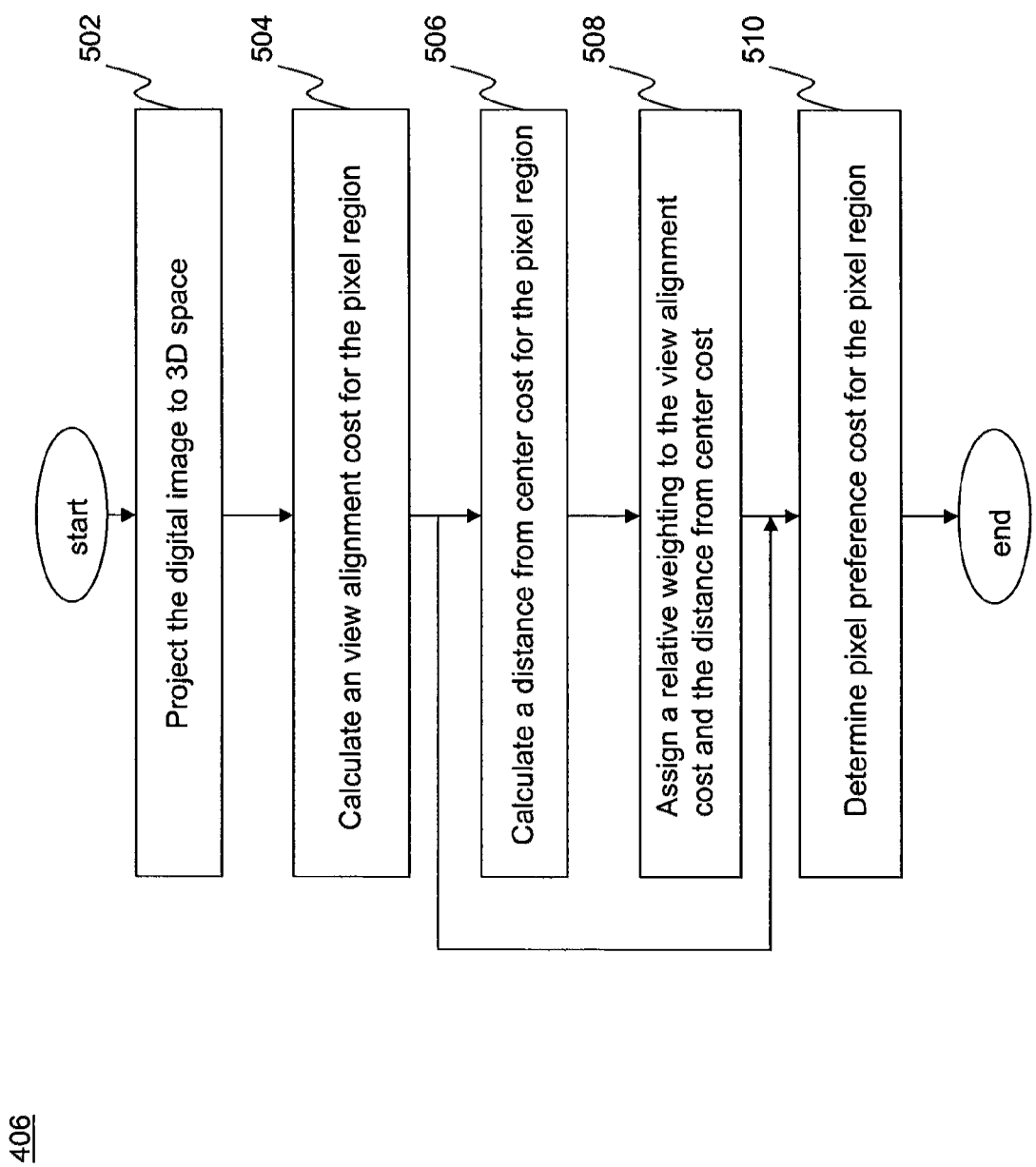
FIG. 5 is a method of determining a pixel preference cost, according to an embodiment of the present invention.

FIG. 5 illustrates, according to an embodiment of the present invention, a process (steps 502-510) for determining the pixel preference cost discussed in relation to step 406 above. In step 504, a view alignment cost is calculated for each of a plurality of pixel regions, based on the three-dimensional projection of the image. The calculation of the view alignment cost can be described with reference to FIGS. 7A and 7B.

Figure 7B:
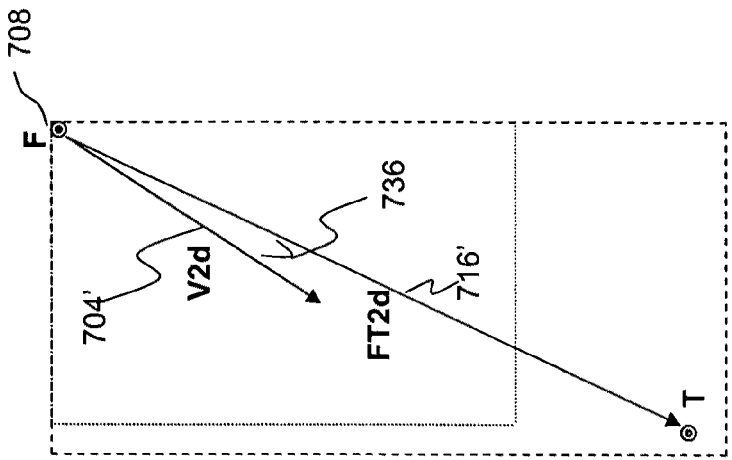
FIGS. 7A and 7B illustrate components of a view angle cost, according to an embodiment of the present invention.
Figure 7A:
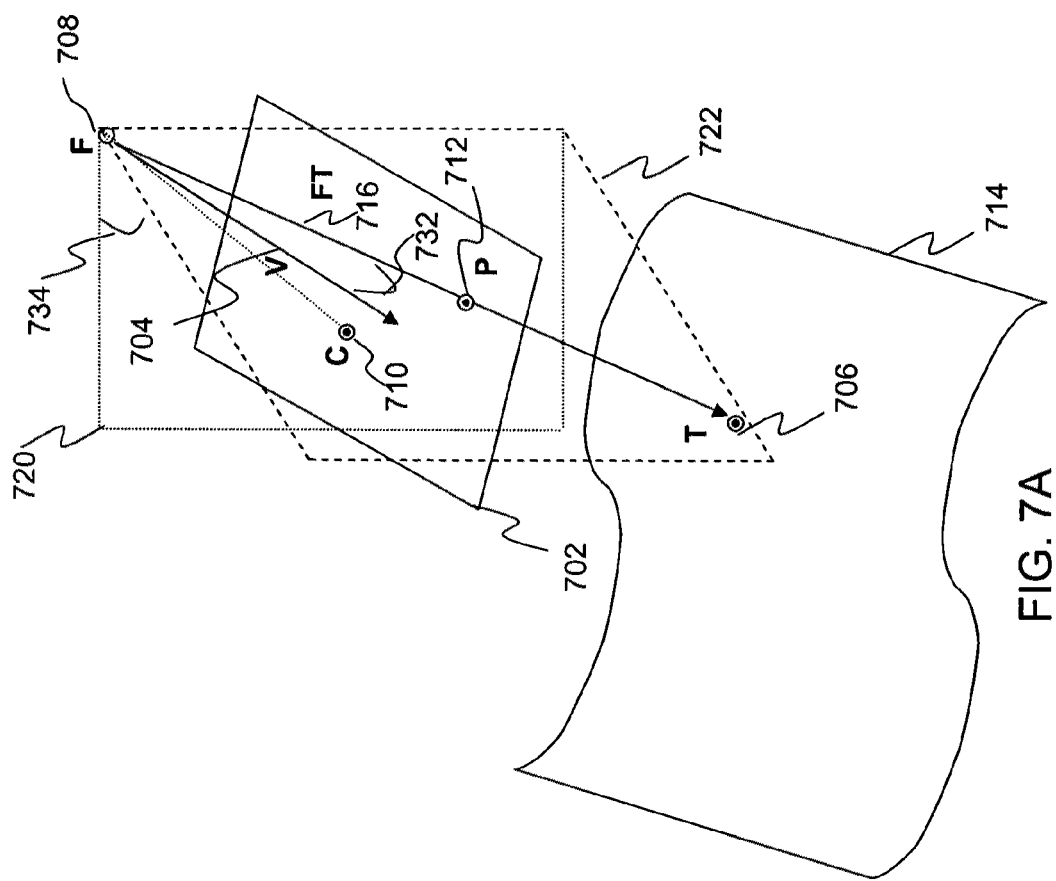

FIG. 7A illustrates the projection of two-dimensional image 702 (camera image) to a three-dimensional space, according to an embodiment of the present invention. In the embodiment illustrated in FIGS. 7A, 7B and 8 each pixel region has a single pixel. A person of skill in the art would understand how to apply the description herein of FIGS. 7A, 7B and 8 to pixel regions having two or more pixels, by, for example but not limited to, considering one or more representative (e.g., center of each pixel region) pixels for each pixel region. Two dimensional image 702 may be an image from the plurality of images accessed according to step 402 described above. The focal point 708 of the camera can be determined based on, for example, the camera information including the location and altitude of the camera at the time of image capture. Focal point (F) 708 is determined as a point in three-dimensional space. C 710 is the center point of the camera image. P 712 is the pixel region point of interest (pixel region under consideration) in the camera image, i.e., the pixel region from two-dimensional image 702 that is being considered to be merged into the stitched image. V 704 is the three-dimensional vector representing the intended view direction of the camera at the time of image capture. The intended view direction can be one of, for example, north, east, south, or west, and angled below the horizontal plane parallel to ground at a predetermined angle. For example, the intended view direction can be north and angled 45 degrees below the horizontal plane. It should be noted that the central direction (actual aim) of the camera, indicated by the line from F 708 to image center C 710 of the image 702, may not coincide with the intended view direction. The intended view direction is generally within a small angle (for example, 5-15 degrees) from the camera direction. T 706 is the point in three-dimensional space obtained by extending the line from F 708 to P 712, to intersect the ground (terrain). The view alignment cost is described below.

Returning to step 504 of FIG. 5, the view alignment cost can be specified as the magnitude of the view angle 732 (shown in FIG. 7A) between the intended view direction specified by V 704, and the line from F 708 to P 712 (i.e., line FT 716). View angle 732 can be represented as the sum of an angle in a horizontal plane (horizontal view angle 734) and an angle in a vertical plane (vertical view angle 736). The horizontal view angle 734 is the angle between the projection of V 704 and the projection of the line from F 708 to T 706, both in the horizontal plane parallel to ground and containing F 708. In other words, horizontal view angle 734 is the angle between the vertical planes perpendicular to ground 714 and containing FT (line 716 from 708 to 706) and V 704, respectively. For example, in FIG. 7A the vertical plane 722 contains FT, and vertical plane 720 contains vector V 704. The vertical view angle can be illustrated as in FIG. 7B. FIG. 7B illustrates, for purposes of explanation, the angle between vector V 704 and FT 716 if vertical planes 720 and 722 were rotated such that they overlap, i.e., angle 736 between V2$d$ 704' and FT2$d$ 716'. Thus, according to an embodiment of the present invention, the view alignment cost can be represented as the sum of a horizontal view angle cost and a vertical view angle cost.

In representing the view alignment cost as the sum of a horizontal view angle cost and a vertical view angle cost, relative weights can be applied to the horizontal view alignment cost and the vertical view alignment cost to reflect the relative influence of each on building lean. The vertical component of the view angle primarily contributes to the appearance of building lean "toward" or "away from" the viewer, while the horizontal component determines the appearance of building lean left or right. It was observed that the amount of building lean does not change significantly as the pixel region under consideration moves vertically away from the image center, while movement of the pixel region under consideration horizontally left or right from the center increases the building lean significantly. To account for this difference, the horizontal cost can be weighted proportionately higher than the vertical cost.

In some embodiments, instead of using the angle between two vectors, angle A between V 704 and FT 716 i.e., A(V, FT), an alternative measure of the form 1−dot_product(V, FT) can be used to determine the view alignment cost. The alternative form may be better suited for reducing building lean for at least for two reasons. First, the alternative measure in the form of a dot product can be computed more efficiently than angle A. Second, although the magnitude of building lean does not significantly increase near the image center as the angle A(V, FT) increases from zero, when angle A is relatively large, i.e., the pixel region is far away from the center, the rate of increase of building lean as a function of A(V, FT) is high. The measure 1−dot_product(V, FT) substantially characterizes this behavior. The horizontal and vertical view alignment costs can be computed based on the dot product as described below.

Let Vh and FTh be the horizontal components of the vectors V and FT, represented as two-dimensional vectors in the XY plane, respectively. Let V2$d$ 704' and FT2$d$ 716' (see FIG. 7B) be the two-dimensional vectors which are the projections of V 704 and FT 716 onto their respective two-dimensional vertical planes containing the vectors V 704 and FT 716. Then, Vh=(Vx, Vy), V2$d$=(sqrt((Vx)$^2$+(Vy)$^2$), Vz), FTh= (FTx, FTy), and FT2$d$=(sqrt((FTx)$^2$+(FTy)$^2$), FTz). Vx, Vy, Vz are respectively x, y, and z components of V 704, and FTx, FTy, and FTz are respectively x, y, and z components of FT 716. Accordingly, in one embodiment, the components of the view alignment cost are:

horizontal view alignment cost=1−dot_product(Vh, FTh), and vertical view alignment cost=1−dot_product(V2$d$, FT2$d$).

And the total view alignment cost can be defined as:

view alignment cost=W1*horizontal view alignment cost+W2*vertical view alignment cost, where W1>0 and W2>0. (Eq. 1)

Weights W1 and W2 are predetermined according to a number of factors, such as, but not limited to, resolution of image, desired quality and performance characteristics, and type of geographic area. Typically, as noted above, the horizontal displacement of a pixel region from the center has a greater impact on building lean, and therefore W1>W2.

In step 506, a distance from center cost is calculated for each of a plurality of pixel regions, based on the three-dimensional projection of the image. The distance to the center cost is designed to capture the relationship between the building lean in images and the distance from the image center to the corresponding pixel regions, e.g., the distance to the center cost being lower nearer the center of an image since building lean is lower nearer the center of an image. The calculation of the distance from center cost can be described using FIG. 8.

Figure 8:
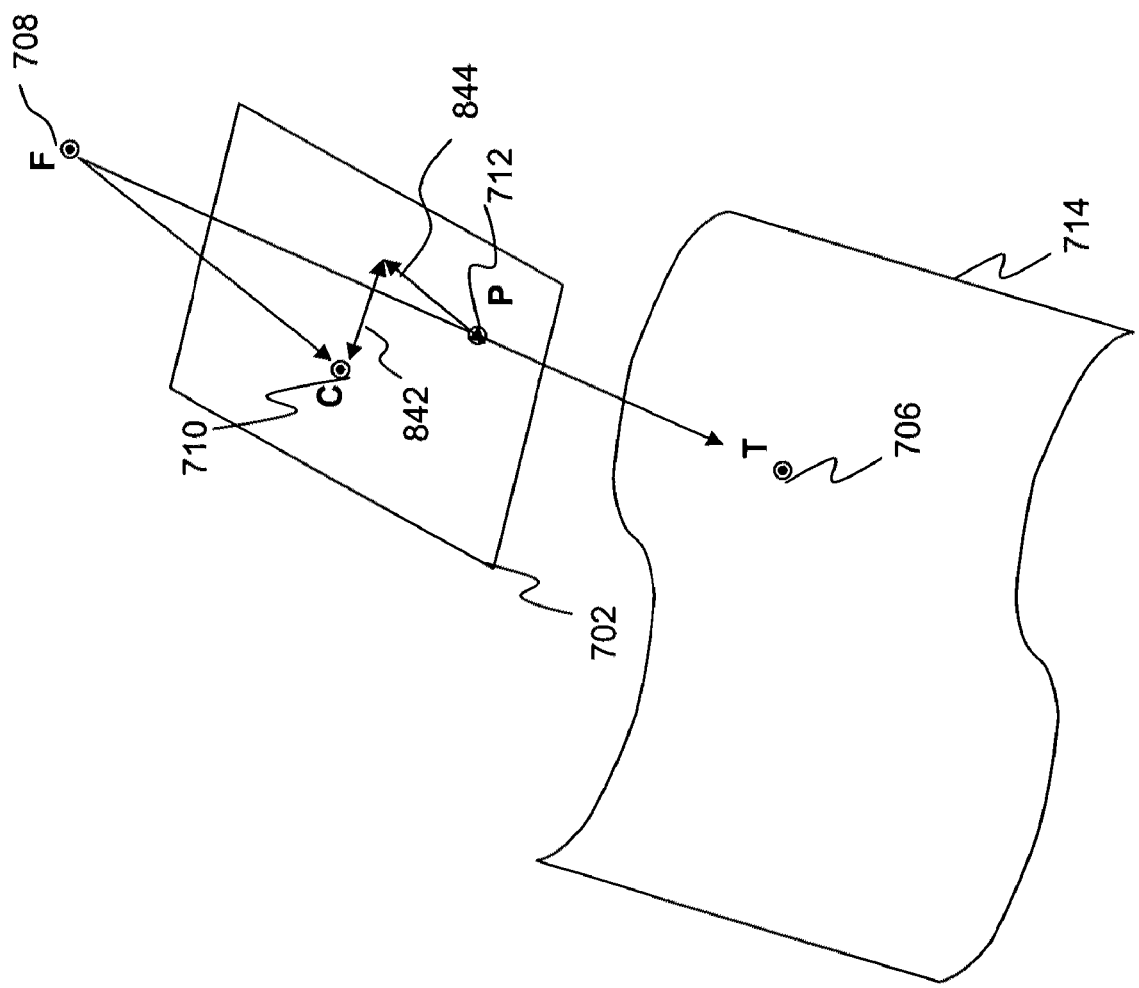
FIG. 8 illustrates components of a distance from center cost, according to an embodiment of the present invention.

In FIG. 8, the distance from center cost is the distance from camera image center C 710 in the three-dimensional projection of the camera image 702 to pixel region under consideration P 712 which is a point in the two-dimensional image. As in the calculation of the view alignment cost in step 504, the distance from center cost can also be represented as a horizontal distance from center cost and a vertical distance from center cost. The horizontal distance to the center cost can be determined as the distance from P 712 to image center C 710 as projected on to the two-dimensional plane of the image or the projection of those points to the horizontal plane of the focal point. For example, the corresponding longitude and latitude measurements can be used to determine the horizontal distance from center cost. The vertical distance from center cost can be determined as the difference between the altitude parameters of P 712 and C 710.

To account for the differences in the impact of horizontal and vertical distance noted above, the horizontal distance from center cost and the vertical distance from center cost can be weighted differently when determining the distance from center cost. Thus, according to an embodiment of the present invention, the distance from center cost can be represented as:

distance from center cost=W3*horizontal distance from center cost+W4*vertical distance from center cost, where W3>0 and W4>0. (Eq. 2)

Value for weights W3 and W4 can be determined based on one or more factors such as, but not limited to, type of geographic area (e.g., urban, rural, etc.), quality and performance characteristics desired, and image resolution. Typically, as noted above, because the horizontal displacement of a pixel region from the center has a greater impact on building lean, and therefore W3>W4.

In step 508, according to an embodiment of the present invention, relative weights can be assigned to the view alignment cost and the distance from center cost according to a predetermined criteria. For example:

pixel preference cost=W5*view alignment cost+W6*distance from center cost, where W5>0 and W6>0. (Eq. 3)

Values for W5 and W6 can be determined based on one or more factors such as, but not limited to, type of geographic area (e.g., urban, rural, etc.), quality and performance desired, and image resolution.

In step 510, the pixel preference cost for the pixel region under consideration, for example, pixel region P 712, is determined, for example, based on the weighted sum of the view alignment cost and the distance from center cost.

As described above with respect to step 501, in another embodiment, pixel preference cost can include only the view alignment cost as determined in steps 502 and 504. For example, as shown in the flowchart of FIG. 5, after steps 502-504, an embodiment may proceed directly to step 510 to determine the pixel preference cost based on the view alignment cost and not including the distance from center cost.

Figure 6:
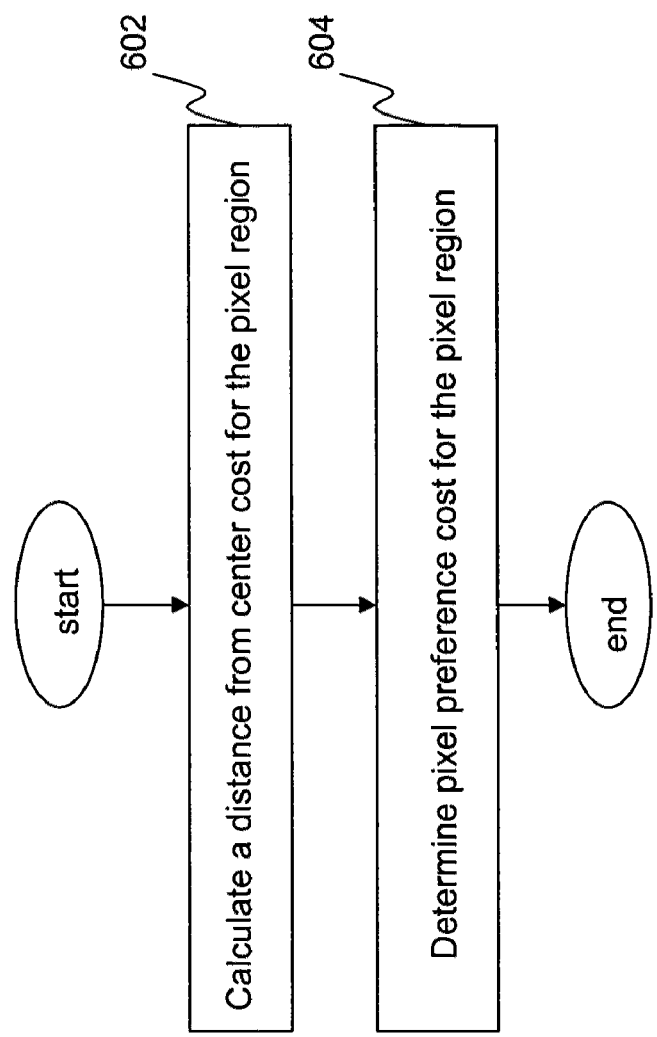
FIG. 6 is a method of determining a pixel preference cost, according to an embodiment of the present invention.

As shown in FIG. 6, in yet another embodiment, the pixel preference cost includes the distance from center cost but not the view alignment cost. According to the embodiment illustrated in FIG. 6, step 406 can be implemented by steps 602 and 604. In step 602, a distance from center is calculated. The calculation of the distance from center can be substantially similar to that described with respect to step 506 above.

In step 604, the pixel preference cost is determined as including the distance from center determined in step 602. The pixel preference cost determined in step 604 may not include a view angle cost.

Determining Total Cost to be Minimized

Thus, the cost function discussed in relation to step 408 above, can be calculated as the sum of a pixel continuity cost that is a measure of pixel color properties among the pixel region being replaced and the newly selected pixel region, and a pixel preference cost that indicates a pixel region's proximity to the intended viewing direction and/or the center of the image where building lean is, in general, minimal:

total cost=W7*pixel continuity cost+W8*pixel preference cost (Eq. 4)

where W7>0 and W8>0, and W7 and W8 can be determined based on factors such as, but not limited to, color characteristics of images, quality of stitched image desired, image resolution, and level of building lean in images.

It should also be noted that, in some embodiments, pixel preference cost may include only one of the view distance cost or the distance from center cost. Thus, based on (Eq. 4), according to various embodiments, total cost=W7*pixel continuity cost+W8*(W5*view alignment cost+W6*distance from center cost) (Eq. 5)

or, total cost=W7*pixel continuity cost+W8*view alignment cost, (Eq. 6)

or, $$\text{total cost} = W7 * \text{pixel continuity cost} + W8 * \text{distance from center cost}. \quad \text{(Eq. 7)}$$

The weights, when determined for one level of image resolution, can be automatically scaled for other levels of resolution. For example, when the resolution is doubled, while the length of the seams doubles the number of pixels quadruples. Therefore, when the resolution is doubled the weight of the view alignment cost can be halved to maintain the level of relative weighting.

It should also be noted that, in some embodiments, pixel preference costs are not calculated for every pixel region position in the stitched image. Instead, pixel preference costs are calculated for pixel region positions at regular predetermined intervals, and the values of the intermediate pixel region positions are interpolated from the calculated values. The interval can be determined based on the desired quality and speed of creating the stitched image.

Figure 9:
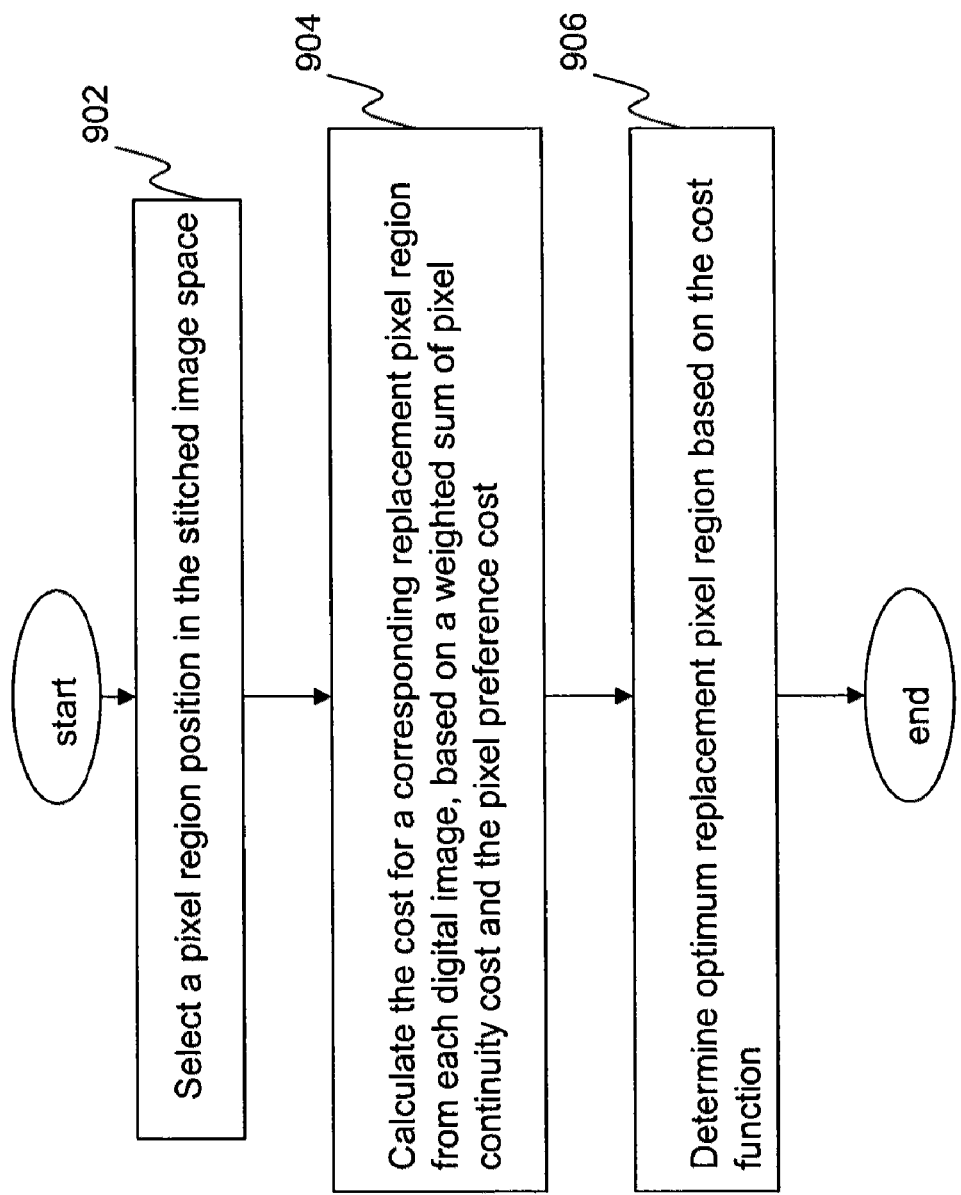
FIG. 9 is a method of selecting a pixel for the stitched image, according to an embodiment of the present invention.

FIG. 9 (steps 902-906) illustrates, according to an embodiment of the present invention, the processing in relation to step 408 described above. Steps 902-906 can be repeated for each of a plurality of pixel region positions in a stitched image of a geographic area.

In step 902, a pixel region is selected. According to one embodiment, the pixel region positions in the stitched image can be processed from left-right and top-bottom to process each pixel region in the geographic area covered by the stitched image.

In step 904, the cost of corresponding replacement pixel regions from one or more images are computed. For example, the value of a cost function, as discussed in relation to step 408 above, is determined with respect to each potential replacement pixel region for the pixel region under consideration.

In step 906, for each of the plurality of pixel region positions in the geographic area represented in the stitched image, a pixel region is chosen from the set of replacement pixel regions considered in step 904. Each replacement pixel region may be chosen so as to optimize, for example, minimize, a cost function such as the cost function of (4). In one embodiment, replacement pixel regions for each pixel region position are chosen so as to globally minimize the cost function (4) over all pixel region positions of the geographic area. In another embodiment, replacement pixel regions can be chosen so as to minimize the cost function in localized areas. In an embodiment, the cost minimization can be performed using a graphcut algorithm.

FIG. 10 is a representation of the stitched image of FIG. 2, after being processed according to an embodiment of the present invention. Attention is drawn to buildings 1002, 1003, 1004, and 1005 that correspond to buildings 202, 203, 204 and 205 shown in FIG. 2. The reduced leaning of the buildings is clearly visible. Overall, due to the reduced building lean, the image of FIG. 10 represents an improvement over FIG. 2.

Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for reducing the lean of at least one building in a stitched image, comprising:
    accessing, by a processor-based system, a plurality of digital images of a geographic area, each image of the plurality of digital images at least partially overlapping one or more other images of said plurality of digital images and containing at least a partial view of the building;
    calculating, by the processor-based system, a pixel preference cost for each pixel region of a plurality of pixel regions in said each image, wherein the pixel preference cost includes a view alignment cost based on an angle between an intended view direction of a camera capturing the respective image and the respective pixel region;
    selecting, by the processor-based system, a pixel region from the plurality of digital images for each of a plurality of pixel region positions in the geographic area by reducing a cost function including the pixel preference cost of the selected pixel region for each of said pixel region positions; and
    assigning, by the processor-based system, the respective selected pixel region to each of the pixel region positions to create the stitched image containing the building with reduced lean.

2. The computer-implemented method of claim 1, wherein the view alignment cost is based on a location of the respective pixel region in a three-dimensional projection of said each image.

3. The computer-implemented method of claim 2, wherein the view alignment cost comprises a vertical view alignment cost and a horizontal view alignment cost, the vertical view alignment cost represents a vertical angle between the intended view direction of the camera and the respective pixel region, and the horizontal view alignment cost represents a horizontal angle between the intended vide direction of the camera and the respective pixel region.

4. The computer-implemented method of claim 3, the calculating further comprising combining the vertical view alignment cost and the horizontal view alignment cost according to a predetermined weighting.

5. The computer-implemented method of claim 2, wherein the location of the respective pixel region is determined in relation to a focal point of a camera capturing the respective image.

6. The computer-implemented method of claim 1, wherein the pixel region preference cost further includes a distance from center cost, wherein the distance from center cost is based on a distance to the respective pixel region from the center of the image.

7. The computer-implemented method of claim 6, wherein the distance from center cost comprises a vertical distance from center cost and a horizontal distance from center cost, the vertical distance from center cost represents a vertical distance to the respective pixel region from the center of the image, and the horizontal distance from center cost represents a horizontal distance of the respective pixel region from the center of the image.

8. The computer-implemented method of claim 7, the calculating further comprising combining the vertical distance from center cost and the horizontal distance from center cost according to a predetermined weighting.

9. The computer-implemented method of claim 1, wherein the cost function further includes a pixel continuity cost.

10. The computer-implemented method of claim 9, wherein the cost function comprises a weighted sum of the pixel continuity cost and the pixel preference cost.

11. The computer-implemented method of claim 10, wherein respective weights for the pixel continuity cost and the pixel preference cost are determined based on a resolution level of the respective image.

12. The computer-implemented method of claim 1, further comprising:
orthorectifying the plurality of digital images.

13. The computer-implemented method of claim 1, wherein the digital images are oblique images.

14. A computer-implemented method for reducing the lean of at least one building in a stitched image, comprising:
accessing, by a processor-based system, a plurality of digital images of a geographic area, each image of the plurality of digital images at least partially overlapping one or more other images of said plurality of digital images and containing at least a partial view of the building;
calculating, by the processor-based system, a pixel preference cost for each pixel region of a plurality of pixel regions in said each image, wherein the pixel preference cost includes a distance from center cost, wherein the distance from center cost is based on a distance to the respective pixel region from the center of the image;
selecting, by the processor-based system, a pixel from the plurality of digital images for each of a plurality of pixel region positions in the geographic area by reducing a cost function including the pixel preference cost of the selected pixel region for each of said pixel region positions; and
assigning, by the processor-based system, the respective selected pixel regions to each of the pixel region positions to create the stitched image containing the building with reduced lean.

15. A system for reducing the lean of at least one building in a stitched image, comprising:
a collection of digital images stored in a memory medium; and
at least one processor communicatively coupled to the memory medium, the at least one processor configured to:
access a plurality of digital images of a geographic area, each image of the plurality of digital images at least partially overlapping one or more other images of said plurality of digital images and containing at least a partial view of the building;
calculate a pixel preference cost for each pixel of a plurality of pixel regions in said each image, wherein the pixel preference cost includes a view alignment cost based on an angle between an intended view direction of a camera capturing the respective image and the respective pixel region;
select a pixel region from the plurality of digital images for each of a plurality of pixel region positions in the geographic area by reducing a cost function including the pixel preference cost of the selected pixel region for each of said pixel region positions; and
assign the respective selected pixel region to each of the pixel region positions to create the stitched image containing the building with reduced lean.

16. The system of claim 15, wherein the view alignment cost is based on a location of the respective pixel region in a three-dimensional projection of said each image.

17. The system of claim 16, wherein the pixel preference cost further includes a distance from center cost, wherein the distance from center cost is based on a distance to the respective pixel region from the center of the image.

18. The system of claim 15, wherein the location of the respective pixel region is determined in relation to a focal point of a camera capturing the respective image.

19. A non-transitory computer readable storage medium having instructions stored thereon, wherein said instructions, when executed by a processor, cause the processor to reduce the lean of at least one building in a stitched image using a method comprising:
accessing a plurality of digital images of a geographic area, each image of the plurality of digital images at least partially overlapping one or more other images of said plurality of digital images, and contains at least a partial view of the building;
calculating a pixel preference cost for each pixel of a plurality of pixel regions in said each image, wherein the pixel preference cost includes a view alignment cost based on an angle between an intended view direction of a camera capturing the respective image and the respective pixel region;
selecting a pixel region from the plurality of digital images for each of a plurality of pixel region positions in the geographic area by reducing a cost function including the pixel preference cost of the selected pixel region for each of said pixel region positions; and
assigning the respective selected pixel region to each of the pixel region positions to create the stitched image containing the building with reduced lean.

20. The non-transitory computer readable storage medium of claim 19, wherein the pixel preference cost further includes a distance from center cost, wherein the distance from center cost is based on a distance to the respective pixel region from the center of the image.

* * * * *

UNITED STATES PATENT AND TRADEMARK OFFICE
CERTIFICATE OF CORRECTION

| | | |
|---|---|---|
| PATENT NO. | : 8,233,741 B1 | |
| APPLICATION NO. | : 12/591366 | |
| DATED | : July 31, 2012 | |
| INVENTOR(S) | : Wilson et al. | |

It is certified that error appears in the above-identified patent and that said Letters Patent is hereby corrected as shown below:

Column 12
Line 58, Claim 3, please replace "intended vide direction" with --intended view direction--.

Signed and Sealed this
First Day of January, 2013

David J. Kappos
*Director of the United States Patent and Trademark Office*